(12) United States Patent
Hosein

(10) Patent No.: US 12,503,563 B2
(45) Date of Patent: Dec. 23, 2025

(54) PATTERNING STRUCTURES IN REACTIVE FERROFLUIDIC POLYMER RESINS

(71) Applicant: Ian D. Hosein, Syracuse, NY (US)

(72) Inventor: Ian D. Hosein, Syracuse, NY (US)

(73) Assignee: SYRACUSE UNIVERSITY

( * ) Notice: Subject to any disclaimer, the term of this patent is extended or adjusted under 35 U.S.C. 154(b) by 794 days.

(21) Appl. No.: 17/846,352

(22) Filed: Jun. 22, 2022

(65) Prior Publication Data

US 2022/0403121 A1 Dec. 22, 2022

Related U.S. Application Data

(60) Provisional application No. 63/213,236, filed on Jun. 22, 2021.

(51) Int. Cl.
| | |
|---|---|
| *C08J 5/00* | (2006.01) |
| *B29C 67/00* | (2017.01) |
| *B29C 67/24* | (2006.01) |
| *B29C 71/04* | (2006.01) |
| *B82Y 25/00* | (2011.01) |
| *C08K 3/22* | (2006.01) |

(52) U.S. Cl.
CPC .............. *C08J 5/005* (2013.01); *B29C 67/00* (2013.01); *B29C 67/24* (2013.01); *B29C 71/04* (2013.01); *B29C 2791/004* (2013.01); *B82Y 25/00* (2013.01); *C08J 2333/08* (2013.01); *C08K 2003/2275* (2013.01); *C08K 2201/01* (2013.01); *C08K 2201/011* (2013.01)

(58) Field of Classification Search
CPC . H01F 1/44; H01F 1/442; H01F 1/445; H01F 1/447; H01F 1/37; B29C 67/00; B29C 67/24; B29C 71/04; B29C 2791/004
See application file for complete search history.

(56) References Cited

U.S. PATENT DOCUMENTS

| | | | |
|---|---|---|---|
| 4,431,689 A * | 2/1984 | Gunter ................. | C09D 157/00 |
| | | | 525/122 |
| 4,750,947 A * | 6/1988 | Yoshiwara ............. | B23K 26/34 |
| | | | 219/121.85 |

FOREIGN PATENT DOCUMENTS

| | | | |
|---|---|---|---|
| JP | S60-214914 | * | 10/1985 |
| JP | S63-150302 | * | 6/1988 |
| JP | S63-175402 | * | 7/1988 |
| JP | S63-185006 | * | 7/1988 |
| JP | S63-239904 | * | 10/1988 |
| JP | H04-39346 | * | 2/1992 |
| JP | H06-136014 | * | 5/1994 |
| JP | H07-60764 | * | 6/1995 |
| JP | H07-66887 | * | 7/1995 |

* cited by examiner

*Primary Examiner* — C Melissa Koslow
(74) *Attorney, Agent, or Firm* — David L. Nocilly; Bond Schoeneck & King PLLC

(57) ABSTRACT

A patterned surface structure formed from a ferrofluidic polymer resin having a plurality of magnetic nanoparticles. The polymer resin is patterned with a magnetic field that is applied to the ferrofluidic polymer resin during curing. The ferrofluidic polymer resin may be cast over a non-magnetic planar substrate. A magnetic field is applied to the ferrofluidic polymer resin to induce a pattern in a surface of the ferrofluidic polymer resin. The patterned ferrofluidic polymer resin is then cured to form the permanently patterned surface.

8 Claims, 3 Drawing Sheets

PATTERNING STRUCTURES IN REACTIVE FERROFLUIDIC POLYMER RESINS

CROSS-REFERENCE TO RELATED APPLICATIONS

The present application claims priority to U.S. Provisional Application No. 63/213,236, filed on Jun. 22, 2021.

BACKGROUND OF THE INVENTION

1. Field of the Invention

The present invention relates to patterned polymers and, more specifically, to an approach for forming patterned polymers using ferrofluidic resins.

2. Description of the Related Art

Anti-wetting, non-stick, self-cleaning, and magnetic surfaces are useful in a variety of fields, from residential and commercial buildings, motorized vehicles, and industrial applications. Polymers are often used to form such coatings, but the creation of the patterned surfaces that provide the desired functionality is difficult. Accordingly, there is a need in the art for an approach for forming patterned polymers that is straightforward.

BRIEF SUMMARY OF THE INVENTION

The present invention comprises a cured ferrofluidic polymer resin having a plurality of magnetic nanoparticles that includes a permanently patterned surface that corresponds to a magnetic field applied to the polymer resin during curing. The patterned polymer comprises a cured ferrofluidic polymer resin having a plurality of magnetic nanoparticles, wherein the cured ferrofluidic polymer resin has a patterned surface corresponding to a pattern that would form in the cured ferrofluidic polymer resin prior to curing in the presence of a magnetic field. The cured ferrofluidic polymer resin may have a thickness between 10 microns and one centimeter. The cured ferrofluidic polymer resin may be formed from a polymer selected from the group consisting of acrylates, methacrylates, thiolenes, and combinations thereof. The cured ferrofluidic polymer resin may be trimethylolpropane triacrylate (TMPTA). The magnetic nanoparticles may be present in amount between 25 and 50 percent by weight of the cured ferrofluidic polymer resin. The magnetic nanoparticles may be selected from the group consisting of ferromagnetic particles, ferrimagnetic particles, and paramagnetic particles. The magnetic nanoparticles may have the composition $Fe_3O_4$.

The present invention also includes a method of forming a patterned polymer having the steps of casting a ferrofluidic polymer resin over a non-magnetic planar substrate, applying a magnetic field to the ferrofluidic polymer resin to induce a pattern in a surface of the ferrofluidic polymer resin, and then curing the ferrofluidic polymer resin to form a patterned surface. Applying the magnetic field and curing the ferrofluid polymer may occur simultaneously. The magnetic field may be produced by a magnetic source positioned above or below the non-magnetic planar substrate. Curing the ferrofluidic polymer resin may be performed by directing energy from an energy source positioned proximately to the ferrofluidic polymer resin. The energy source and the magnetic source may be rastered over the ferrofluidic polymer resin during the step of curing the ferrofluidic polymer resin. Alternatively, the energy source and the magnetic source may be stationary with the ferrofluidic polymer resin moved when curing ferrofluidic polymer resin. The energy source may be positioned above the ferrofluidic polymer resin and adjacent to the magnetic source.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
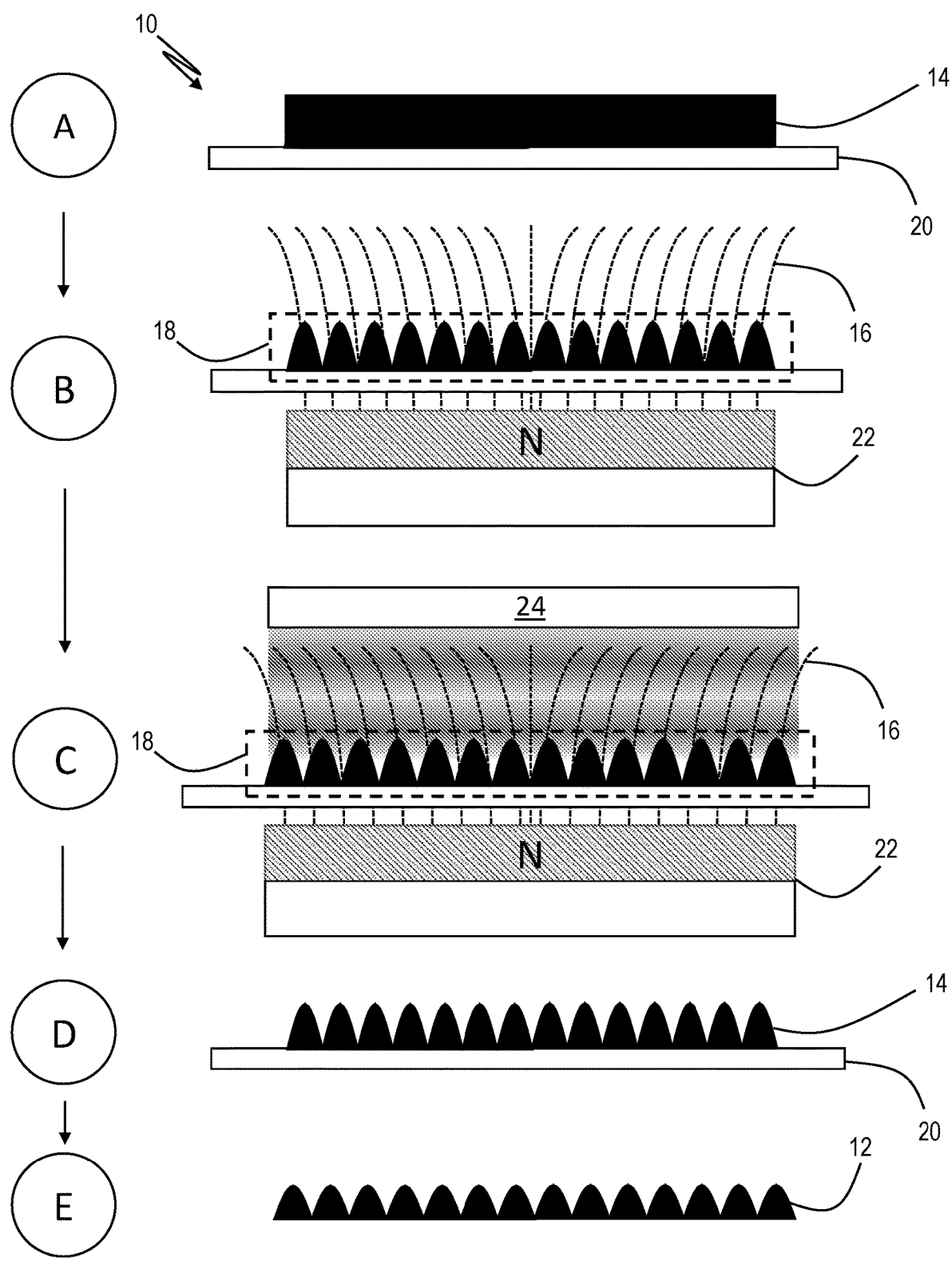
FIG. 1 is a schematic of an approach for forming a patterned surface in cured polymer resin using a ferrofluidic polymer resin and a magnetic field during the curing process according to the present invention.

Referring to the figures, wherein like numeral refer to like parts throughout, there is seen in FIG. 1 a schematic of an approach 10 for forming a predetermined patterned surface 12 on a cured ferrofluidic polymer resin 14. The approach of the present invention involves the use of magnetic field 16 to form different patterns 18 in resin 14, and those patterns are permanently captured through curing of the resin (i.e., hardening) to form surface 12. In a first step a ferrofluidic polymer resin 14, such as a ferrofluidic photopolymer or thermopolymer, is cast over a non-magnetic planar surface 20, as seen in Step A of FIG. 1. Magnetic field 16 is then applied to ferrofluidic polymer resin 14 by a magnet 22 to cause different patterns 18 to form in resin 14 according to the patterning of the magnetic field, as seen in Step B of FIG. 1. While the pattern is being magnetically induced in ferrofluidic polymer resin 14, ultraviolet (UV) light or heat from a UV or heat source 24 is then applied to initiate curing and hardening of the polymer resin component, as seen in Step C of FIG. 1. Once resin 14 is cured, patterns 18 remain in the cured resin 14 even if magnetic field 18 is removed, as seen in FIG. 1D. Patterned resin 14 may then be removed from substrate 20 to provide patterned surface 12, as seen in FIG. 1E, and used in a desired application. The structure of ferrofluidic polymer resin 14 may be changed by varying the strength of the magnetic field and the orientation of the magnetic field, as well as by changing the geometry of the magnetic field. The thickness of resin 14 that may be patterned according to the present invention can vary from 10 microns 2 several millimeters up to 1 centimeter. Patterned surface 12 of cured ferrofluidic polymer resin 14 may be used for a variety of applications, including anti-wetting, non-stick, self-0cleaning, and magnetic surfaces.

A reactive ferrofluidic polymer resin that is acceptable for use with the present invention may consist of a UV or heat curable photopolymer mixed with magnetizable nanoparticles. An appropriate surfactant may be used to stabilize the nanoparticles in the polymer resin. For example, the photopolymer may comprise any type of free radical monomer, including acrylates, methacrylates, thiol-ene chemistries, their blends, as well as their formulations, including monomers with higher functionality. The monomer is formulated with either a UV photoinitiator or a thermal initiator. In an example of the present invention, the monomer used was trimethylolpropane triacrylate (TMPTA), and the photoinitiator and thermoinitiator were Irgacure 784 and Benzophenone, respectively.

Commercial ferrofluidic solutions may also be used, by formulating it with soluble polymer resins to enable the solutions to be cured. The solvent may be removed after curing.

Nanoparticles acceptable for use with the present invention can comprise any particles with compositions that can be magnetized, including ferromagnetic particles, ferrimagnetic particles, paramagnetic particles. In an example of the present invention, the nanoparticle composition was $Fe_3O_4$ (magnetite). Nanoparticles concentrations can range from 25 (dilute) to 50 (concentrated) percent by weight.

In one embodiment, the present invention comprises the use of a fixed location where the photopolymer resin 14 is cast. Magnetic field 16 is then produced by energizing a magnetic source 22 positioned adjacently to the fixed location or bringing a magnetic source 22 in close proximity to resin 14. Finally, resin 14 is cured with magnetic field 16 in place, such as by irradiating the resin with UV light form UV source 24. This embodiment is seen in FIG. 1.

Figure 2:
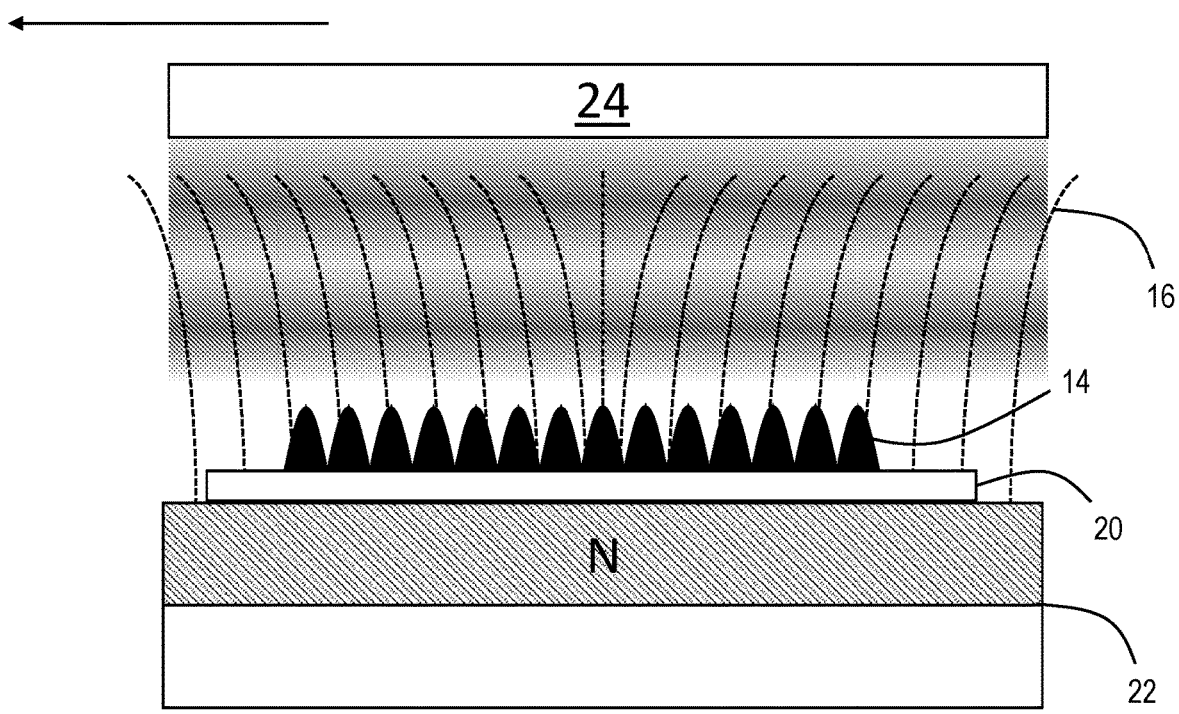
FIG. 2 is a schematic of combined magnetic field and curing source (UV or Heat) which may be rastered over a casted resin in the middle for continuous patterning of the resin.

In another embodiment, cast resin 14 is exposed to a combination of magnetic field 16 positioned under resin 14 and UV light or heat source 24 is rastered over top of cast resin 14 such that there is a concurrent formation of patterned structure 18 and curing. This embodiment is seen in FIG. 2. Likewise, the combination of magnetic field 16 and UV light source 24 may remain fixed, and resin 14 moved between magnetic field 16 and UV light source 24, for example by positioning resin 14 and substrate 20 on a conveyor belt.

Figure 3:
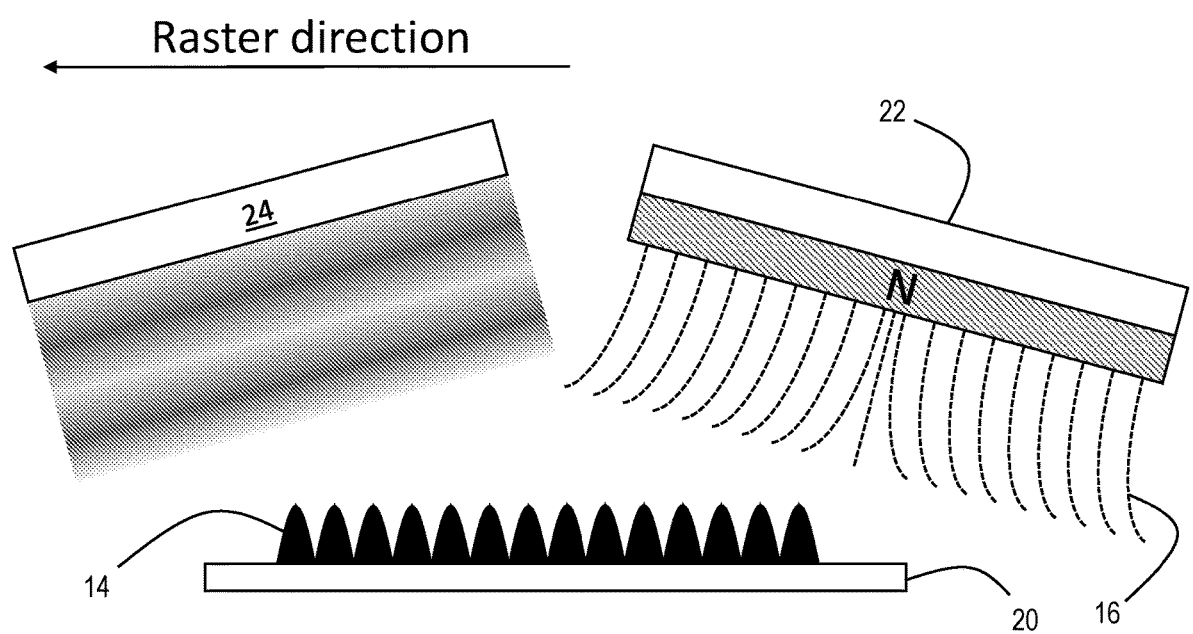
FIG. 3 is a schematic of separate magnetic field and curing source (UV or Heat) which may be rastered over a casted resin in the middle for continuous patterning of the resin.

In a further embodiment, both magnetic field 16 and UV light source 24 are positioned over resin 14 and then rastered over resin 24 to pattern and cure the resin simultaneously. This embodiment is seen in FIG. 3.

What is claimed is:

1. A method of forming a patterned polymer, comprising the steps of:
   casting a ferrofluidic polymer resin over a non-magnetic planar substrate;
   applying a magnetic field to the ferrofluidic polymer resin to induce a pattern in a surface of the ferrofluidic polymer resin; and
   curing the ferrofluidic polymer resin to form a patterned surface.

2. The method of claim 1, wherein the step of applying the magnetic field and the step of curing the ferrofluid polymer occur simultaneously.

3. The method of claim 2, wherein the magnetic field is produced by a magnetic source positioned below the non-magnetic planar substrate.

4. The method of claim 3, wherein the step of curing the ferrofluidic polymer resin is performed by directing energy from an energy source positioned proximately to the ferrofluidic polymer resin.

5. The method of claim 4, wherein the energy source and the magnetic source are rastered over the ferrofluidic polymer resin during the step of curing the ferrofluidic polymer resin.

6. The method of claim 4, wherein the energy source and the magnetic source are stationary and the ferrofluidic polymer resin is moved during the step of curing ferrofluidic polymer resin.

7. The method of claim 2, wherein the magnetic field is produced by a magnetic source positioned above the ferrofluidic polymer resin.

8. The method of claim 7, wherein the energy source is positioned above the ferrofluidic polymer resin and adjacent to the magnetic source.

* * * * *